(12) United States Patent
Hasegawa

(10) Patent No.: US 11,106,003 B2
(45) Date of Patent: Aug. 31, 2021

(54) LENS BARREL AND IMAGING APPARATUS

(71) Applicant: CANON KABUSHIKI KAISHA, Tokyo (JP)

(72) Inventor: Tomoki Hasegawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 642 days.

(21) Appl. No.: 15/964,376

(22) Filed: Apr. 27, 2018

(65) Prior Publication Data

US 2018/0321461 A1 Nov. 8, 2018

(30) Foreign Application Priority Data

May 2, 2017 (JP) .............................. JP2017-091555

(51) Int. Cl.
| | | |
|---|---|---|
| *G02B 7/10* | (2021.01) | |
| *G02B 7/02* | (2021.01) | |
| *G02B 7/04* | (2021.01) | |

(52) U.S. Cl.
CPC ................. *G02B 7/10* (2013.01); *G02B 7/02* (2013.01); *G02B 7/04* (2013.01)

(58) Field of Classification Search
CPC ............... G02B 7/02; G02B 7/10; G02B 7/04
See application file for complete search history.

(56) References Cited

U.S. PATENT DOCUMENTS

| | | | |
|---|---|---|---|
| 5,510,936 A * | 4/1996 | Aoki | ...................... G02B 7/023 359/822 |
| 6,507,705 B1 | 1/2003 | Kasha | |
| 7,466,504 B1 | 12/2008 | Koyama | |
| 2008/0279491 A1 | 11/2008 | Matsumoto | |

FOREIGN PATENT DOCUMENTS

| | | |
|---|---|---|
| JP | H06167645 A | 6/1994 |
| JP | H1184210 A | 3/1999 |
| JP | 2001264613 A | 9/2001 |
| JP | 2009031424 A | 2/2009 |
| JP | 2009134022 A | 6/2009 |

OTHER PUBLICATIONS

Office Action issued in Japanese Appln. No. 2017-091555 dated Feb. 4, 2020. English translation provided.

\* cited by examiner

*Primary Examiner* — Alicia M Harrington
(74) *Attorney, Agent, or Firm* — Rossi, Kimms & McDowell LLP

(57) ABSTRACT

A lens barrel includes a first lens holder configured to hold a lens and movable along an optical axis in the lens, a cylindrical member configured to hold the first lens holder on an internal circumference surface, first and second rolling members provided to the first lens holder, and rotatably disposed at different positions in an optical axis direction of the lens, a third rolling member rotatably provided to the first lens holder, and an urging member configured to urge the third rolling member against an internal surface of the cylindrical member to an outside in a radial direction of the lens.

21 Claims, 11 Drawing Sheets

LENS BARREL AND IMAGING APPARATUS

BACKGROUND OF THE INVENTION

Field of the Invention

The present invention relates to a lens barrel and an imaging apparatus having the same.

Description of the Related Art

A variety of structures, such as a structure using a cam and roller, have conventionally been proposed for a lens barrel that includes a plurality of lens units movable along an optical axis for zooming and focusing. As the recently promoted miniaturization and high resolution of an optical apparatus etc., a decentering lens unit becomes more influential on the optical performance deterioration. Hence, in moving a plurality of lens units, each lens unit is required to be accurately held without changing relative inclinations.

Japanese Patent Laid-Open No. ("JP") 2009-31424 discloses a lens barrel that forces and supports a second moving frame in a first moving frame through a roller. This structure can maintain smooth operations of the first and second moving frames, and restrain inclinations of the first and second moving frames relative to the optical axis.

However, according to the lens barrel disclosed in JP 2009-31424, the spring-forced pressing roller is held by the first moving frame, and the receiving roller is held by the second moving frame. Hence, as the second moving frame moves in the optical axis direction, a relative positional relationship changes between the receiving roller and the pressing roller. In other words, an application point to the second moving frame of the spring force changes as the second moving frame moves and a constant force cannot always be applied while the application point moves relative to the second moving frame. In addition, when the parallelism (relative angle) changes between two guide grooves formed in the first moving frame that guides the movement of the second moving frame in the optical axis direction, the second moving frame cannot move at all or steadily or smoothly move and the guide grooves must be accurately worked.

SUMMARY OF THE INVENTION

The present invention provides a lens barrel and an imaging apparatus, which can smoothly move moving frames and restrain relative inclination changes between two moving frames.

A lens barrel according to one aspect of the present invention includes a first lens holder configured to hold a lens and movable along an optical axis in the lens, a cylindrical member configured to hold the first lens holder on an internal circumference surface, first and second rolling members provided to the first lens holder, and rotatably disposed at different positions in an optical axis direction of the lens, a third rolling member rotatably provided to the first lens holder, and an urging member configured to urge the third rolling member against an internal surface of the cylindrical member to an outside in a radial direction of the lens.

Further features of the present invention will become apparent from the following description of exemplary embodiments with reference to the attached drawings.

DESCRIPTION OF THE EMBODIMENTS

Figure 1:
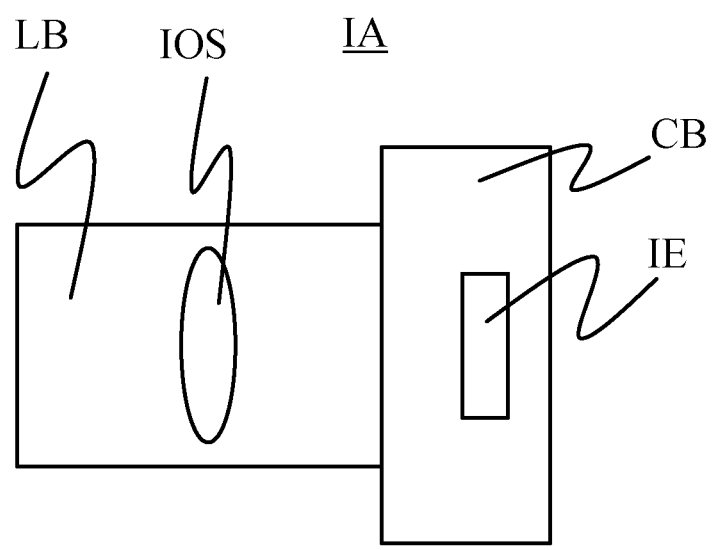
FIG. 1 is a schematic view of an imaging apparatus that includes a lens barrel according to embodiments of the present invention.

Referring now to the accompanying drawings, a description will be given of embodiments according to the present invention. In each figure, corresponding elements will be designated by the same reference numerals, and a duplicate description thereof will be omitted.

FIG. 1 is a schematic view of an imaging apparatus IA that includes a lens barrel LB according to the embodiments of the present invention. The lens barrel LB holds an imaging optical system IOS. A camera body CB holds an image sensor IE. The lens barrel LB may be integrated with the camera body CB, or the camera body CB may be detached from and attached to the camera body CB. In the following description, an object side of the lens barrel LB will be referred to as a front side and a camera body CB side of the lens barrel LB will be referred to as a backside.

This embodiment is applicable to an optical apparatus including an imaging optical system, such as a video camera and a surveillance camera, an observation apparatus, such as a binocular, and an image projection apparatus, such as a liquid crystal projector, in addition to the lens barrel detachably attached to the camera body and the lens integrated camera.

First Embodiment

Figure 2:
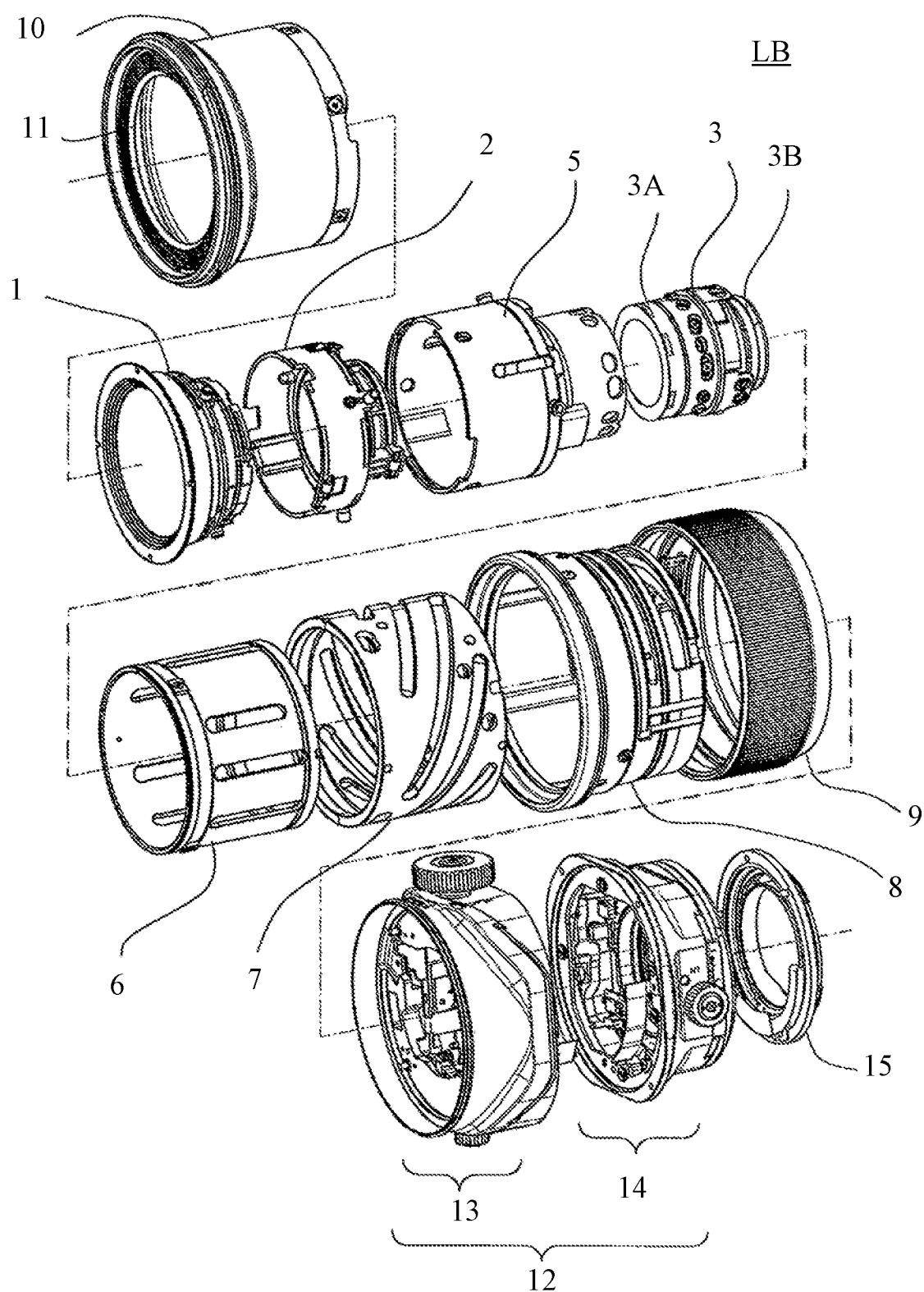
FIG. 2 is an exploded perspective view of the lens barrel.
Figure 3:
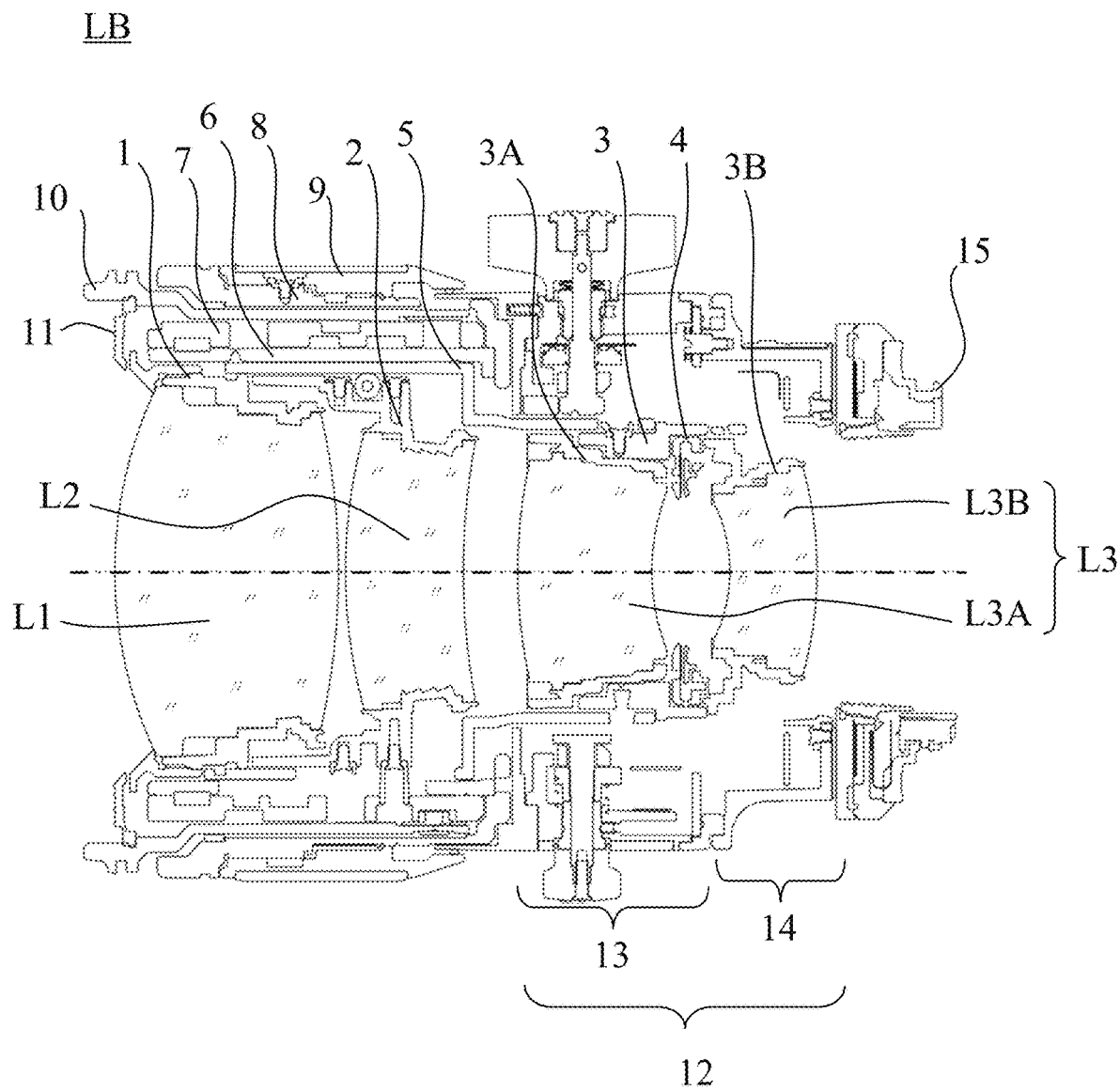
FIG. 3 is a sectional view of the lens barrel focused on infinity.
Figure 4:
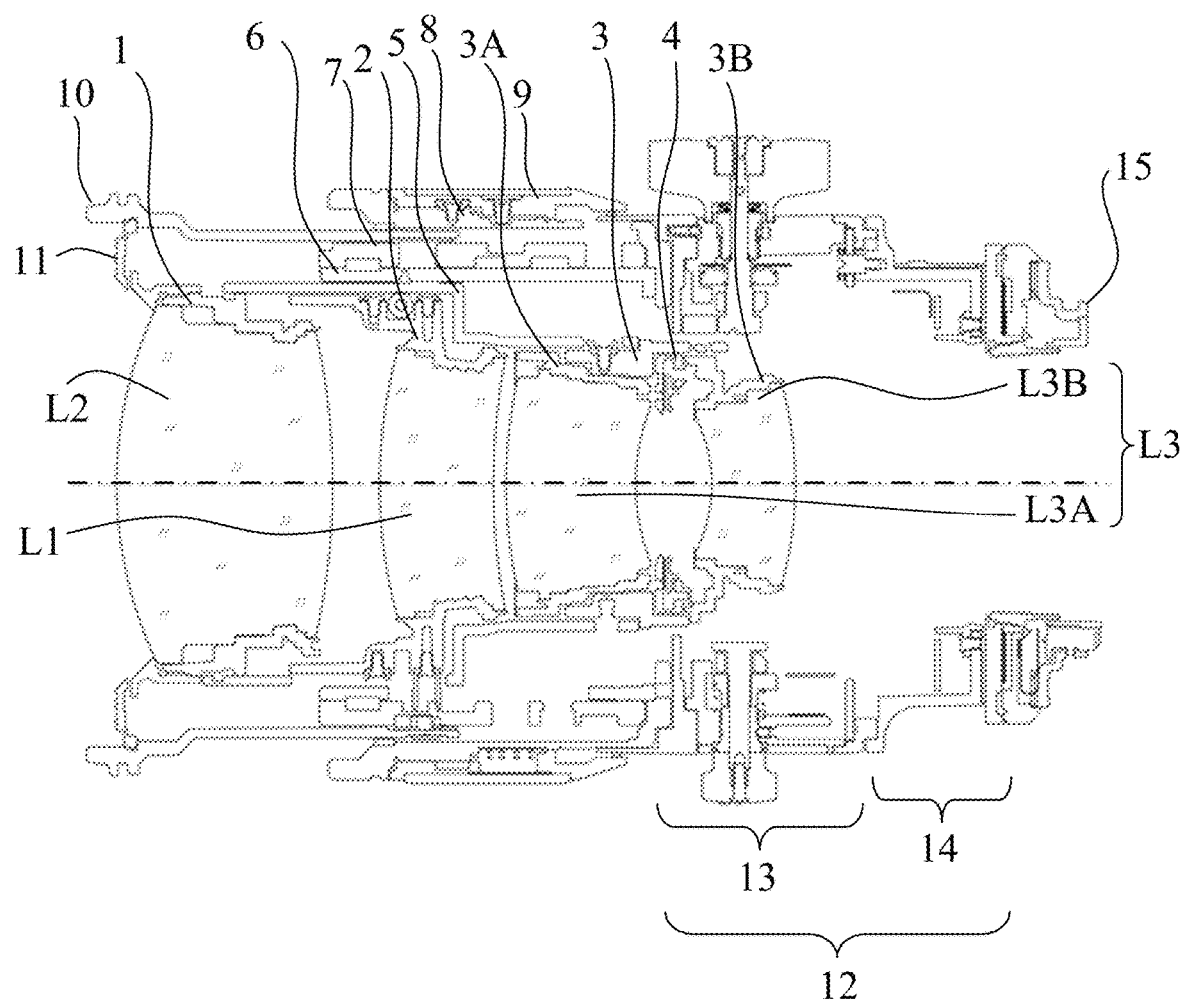
FIG. 4 is a sectional view of the lens barrel focused on a near side.

FIG. 2 is an exploded perspective view of the lens barrel LB. FIG. 3 is a sectional view of the lens barrel LB focused on infinity, and FIG. 4 is a sectional view of the lens barrel LB focused on the near side. The lens barrel LB according to this embodiment includes a first lens unit L1, a second lens unit L2, and a third lens unit L3 as an imaging optical system IOS. A first lens holding frame (second lens holder) 1 holds a first lens unit L1 and is fixed onto a linear cylinder (cylindrical member, straight movable cylinder) 5. A second lens holding frame (first lens holder) 2 holds the second lens unit L2 and is held movable along the optical axis by the linear cylinder 5. A third lens holding frame (third lens holder) 3 holds the third lens unit L3, and is fixed onto the linear cylinder 5. The third lens holding frame 3 includes a third lens holding frame 3A and a third lens holding frame 3B. The third lens unit L3 includes a 3A-th lens unit L3A and a 3B-th lens unit L3B. The third lens holding frame 3A holds the 3A-th lens unit L3A, and the third lens holding frame 3B holds the 3B-th lens unit L3B.

An aperture stop (diaphragm) unit 4 is fixed onto the third lens holding frame 3 by unillustrated screws. The stop unit 4 includes a motor (not illustrated) as a driving source, and changes an opening area in aperture stop blades to adjust a light quantity by controlling driving the motor.

A guide cylinder (guide member) 6 is disposed on an outer circumference surface of the linear cylinder 5. The guide cylinder 6 includes a plurality of linear grooves that extend in the optical axis direction, and guide movements of the linear cylinder 5 and a moving cylinder 10. A cam cylinder (cam member) 7 is engaged with the outer circumference surface of the guide cylinder 6, and supported rotatably in the optical axis direction at a predetermined position relative to the guide cylinder 6. The guide cylinder 6 is screwed on an internal circumference surface side of a body cylinder 8. An operating ring 9 is engaged with an outer circumference surface of the body cylinder 8, and supported rotatably at a predetermined position. The operating ring 9 has a key (not illustrated) connected to the cam cylinder 7. The moving cylinder 10 includes a cover attachment part on an outer diameter side at the front tip, a filter screw part at an inner diameter side, and a front cover 11 engaged with the filter screw part.

The cam cylinder 7 has three cam grooves engaged with three rollers provided on the outer circumference surface of the linear cylinder 5, and cam grooves engaged with the rollers provided on the outer circumference surface of the second lens holding frame 2. The cam cylinder 7 has three cam grooves engaged with three rollers projecting to the internal circumference surface side of the moving cylinder 10. The three rollers of the linear cylinder 5 are engaged with the three linear grooves formed in the guide cylinder 6. The three rollers in the moving cylinder 10 are engaged with other three linear grooves formed in the guide cylinder 6. The rollers of the second lens holding frame 2 are engaged with the linear grooves formed in the linear cylinder 5.

As the operating ring 9 rotates, the cam cylinder 7 rotates via the connected key (not shown). The linear cylinder 5, the second lens holding frame 2, and the moving cylinder 10 follow loci of the cam grooves formed in the cam cylinder 7 and move in the optical axis while guided by linear grooves engaged with these rollers. The linear cylinder 5 and the second lens holding frame 2 follow different cam groove loci, and thus move back and forth while changing a distance between the first lens holding frame 1 fixed onto the linear cylinder 5 and the second lens holding frame 2 and a distance between the second lens holding frame 2 and the third lens holding frame 3 fixed onto the linear cylinder 5. In accordance with the operation of the rotating ring 9, each lens unit can move from the infinity (or far) object focused state illustrated in FIG. 2 to the near object focused state illustrated in FIG. 3, and can be focused according to an object distance.

A tilt and shift mechanism portion 12 is fixed onto the body cylinder 8 via screws, and includes a tilt mechanism portion 13 and a shift mechanism portion 14. The tilt mechanism portion 13 can tilt the optical axis in the imaging optical system IOS relative to the imaging plane of the image sensor IE. When a knob provided to an exterior part, the shift mechanism portion 14 can parallel move the optical axis in the imaging optical system IOS in a direction orthogonal to the optical axis relative to the imaging plane of the image sensor IE. Tilting by the tilt mechanism portion 13 and shifting by the shift mechanism portion 14 provide tilt and shift imaging. The tilt and shift mechanism portion 12 includes a revolving mechanism configured to revolve the entire lens barrel (lens cylinder) LB relative to the camera body CB around the optical axis, and a revolving mechanism configured to revolve the tilt mechanism part 13 around the optical axis so as to change a relative relationship in the shifting direction and the tilting direction. A mount 15 is used to attach the lens barrel LB to the camera body CB, and fixed onto the tilt and shift mechanism portion 12 via unillustrated screws.

Figure 5:
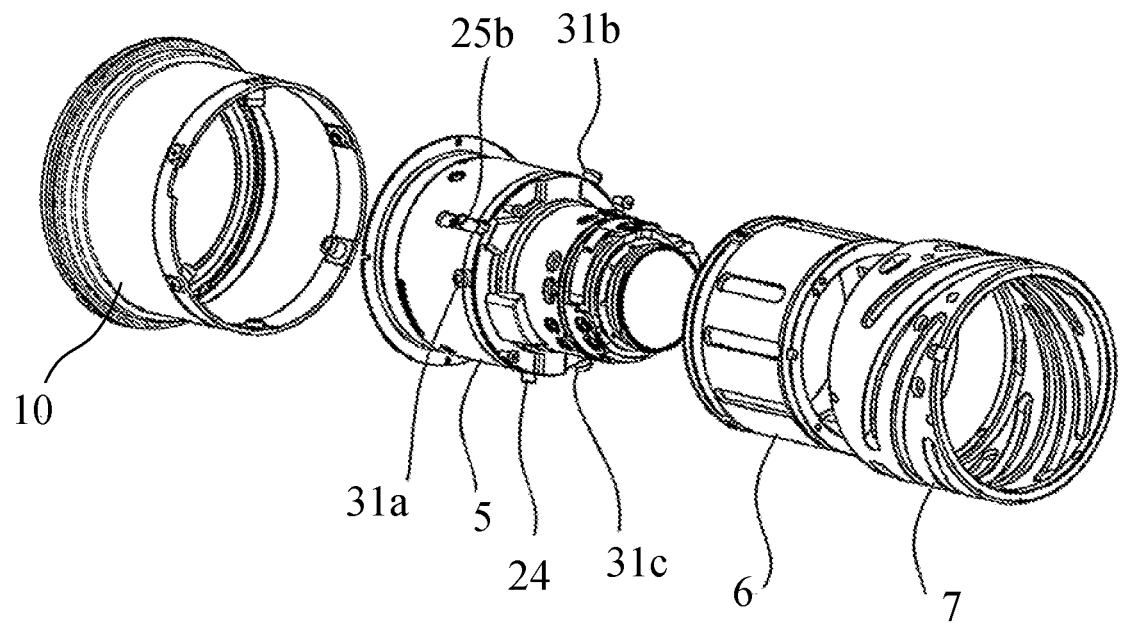
FIG. 5 is an exploded perspective view of a moving mechanism member.
Figure 6:
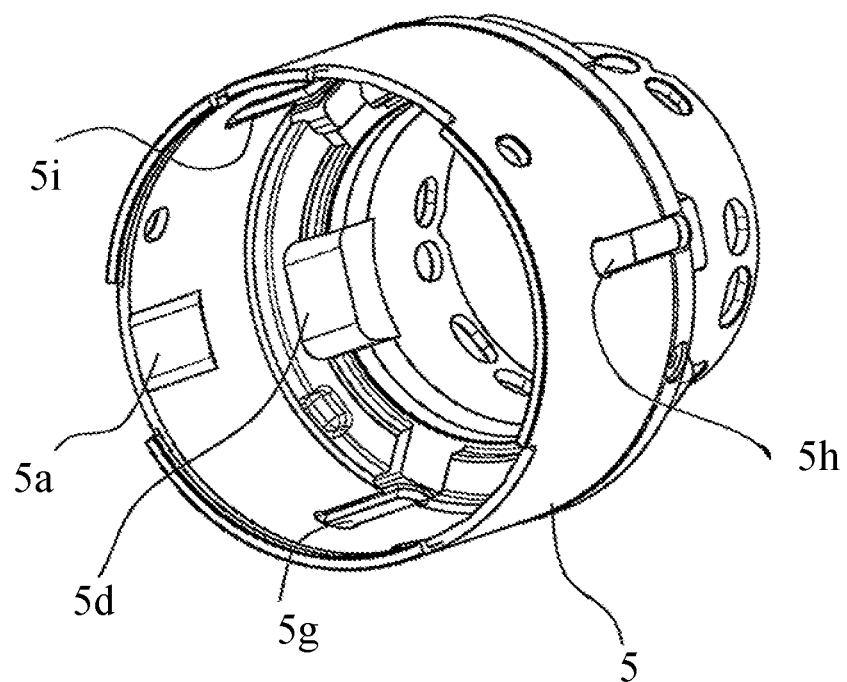
FIG. 6 is a perspective view of a linear cylinder.
Figure 7:
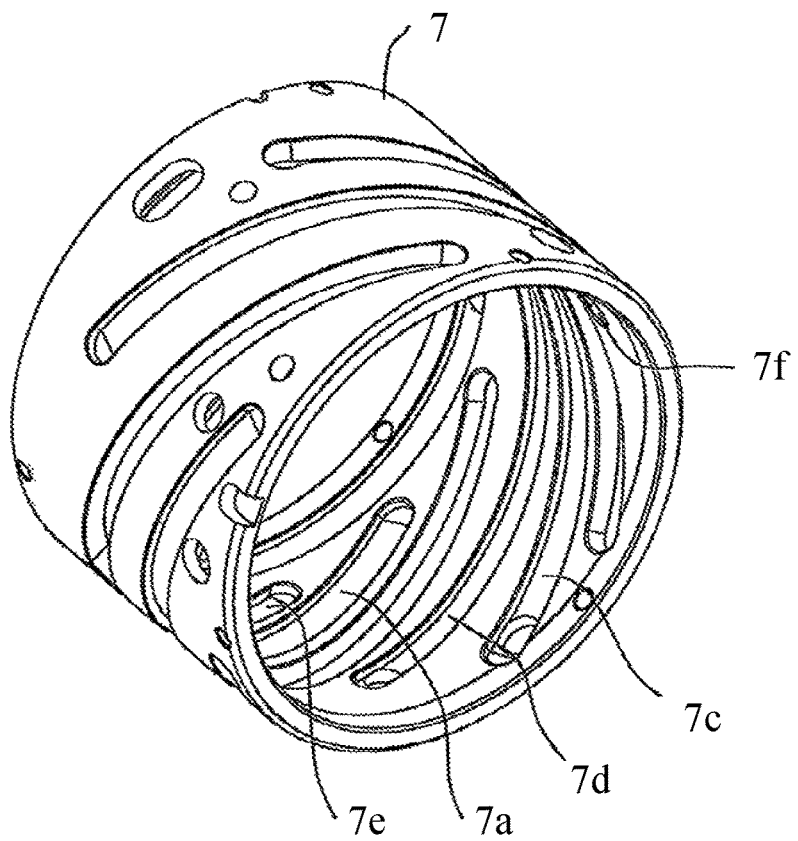
FIG. 7 is a perspective view of a cam cylinder.
Figure 8:
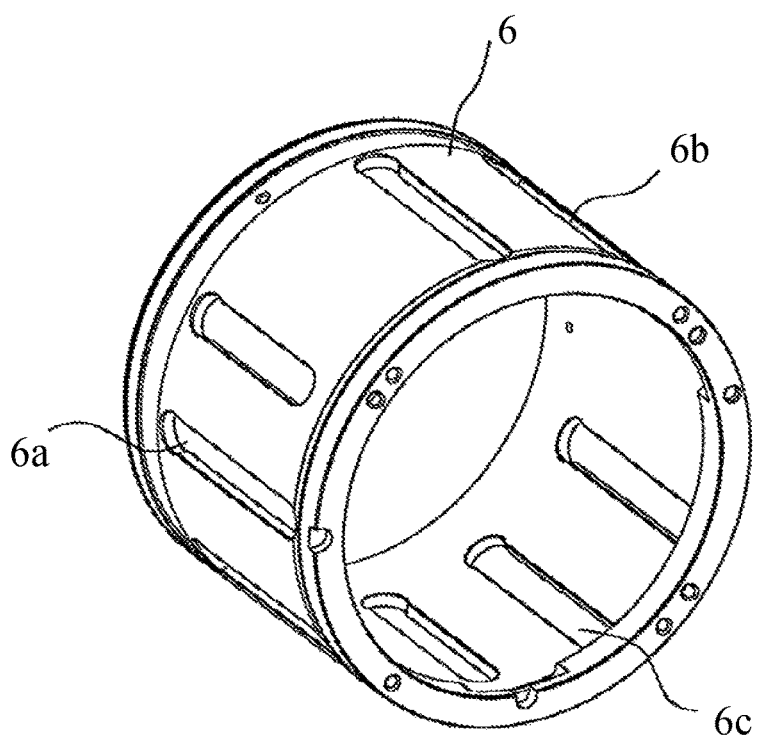
FIG. 8 is a perspective view of a guide cylinder.

Next follows a description of a moving mechanism part that moves the along the optical axis in the lens barrel LB. FIG. 5 is an exploded perspective view of the moving mechanism part viewed from the backside. FIG. 6 is a perspective view of the linear cylinder 5 viewed from the front side. FIG. 7 is a perspective view of the cam cylinder 7 viewed from the backside. FIG. 8 is a perspective view of the guide cylinder 6 viewed from the backside.

Three rollers (first roller members) 31a, 31b, and 31c provided on the outer circumference surface of the linear cylinder 5 are screwed on the linear cylinder 5. The guide cylinder 6 has three perforating linear grooves 6a, 6b, and 6c that extend in the optical axis direction, and are engaged with the rollers 31a, 31b, and 31c. Non-perforating cam grooves (first cam grooves) 7a, 7b (not shown), and 7c are formed on the internal circumference side of the cam cylinder 7, and are engaged with the rollers 31a, 31b, and 31c. As described above, the cam cylinder 7 is rotatably supported at a predetermined position relative to the guide cylinder 6 in the optical axis direction, and as the cam cylinder 7 rotates, the linear cylinder 5 moves along the optical axis through the cam grooves 7a, 7b, and 7c while guided by the linear grooves 6a, 6b, and 6c. Since the first lens holding frame 1 and the third lens holding frame 3 are fixed onto the linear cylinder 5, as the linear cylinder 5 moves, the first lens holding frame 1 and the third lens holding fame 3 integrally move.

Figure 9:
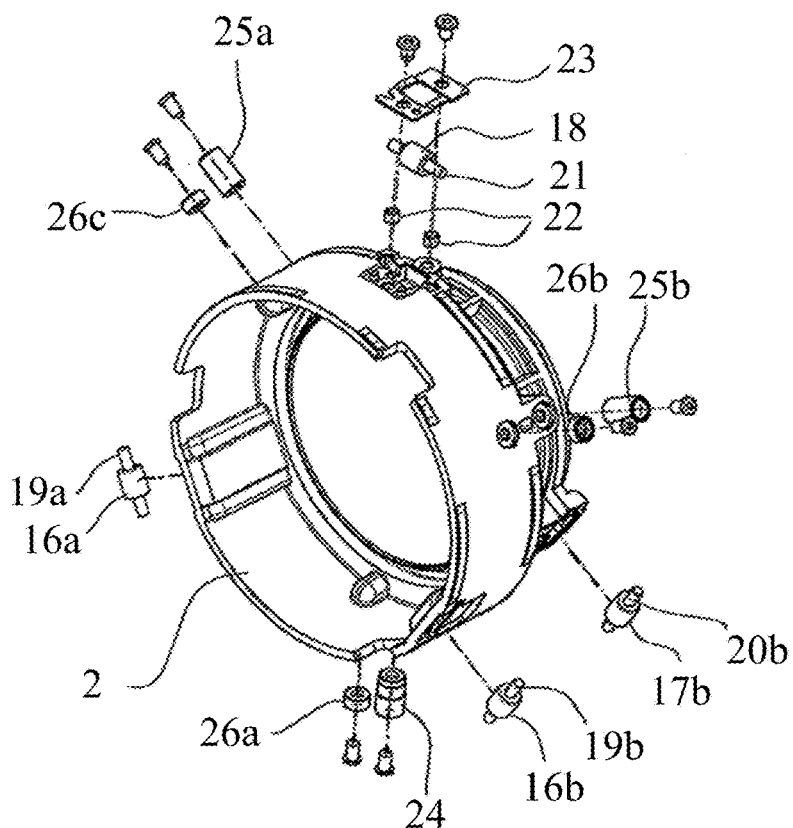
FIG. 9 is an exploded perspective view of a second lens holding frame according to a first embodiment.
Figure 10:
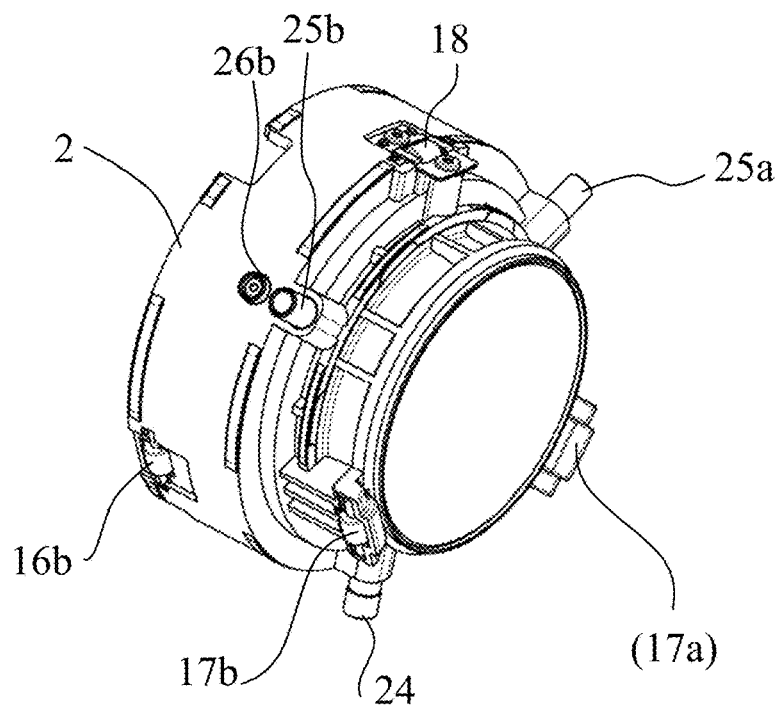
FIG. 10 is a perspective view of the second lens holding frame according to the first embodiment.
Figure 11:
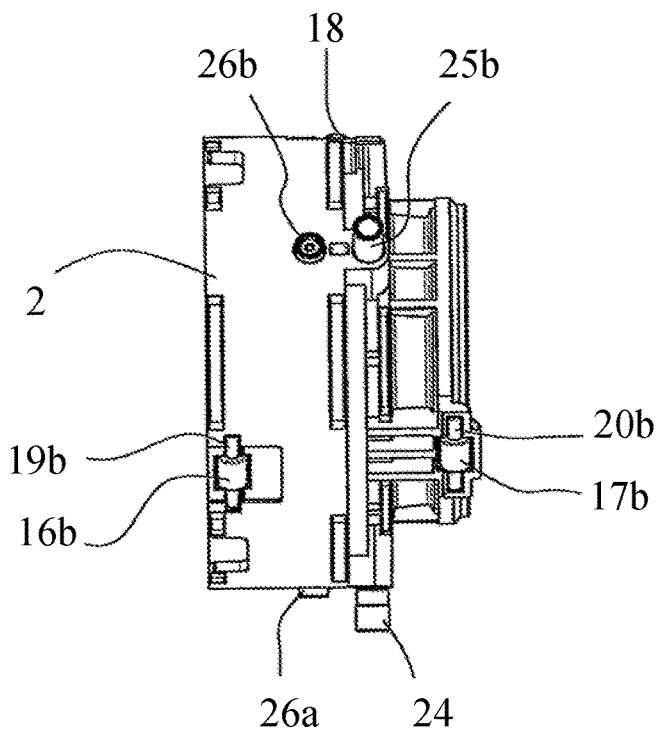
FIG. 11 is a side view of the second lens holding frame according to the first embodiment.
Figure 12:
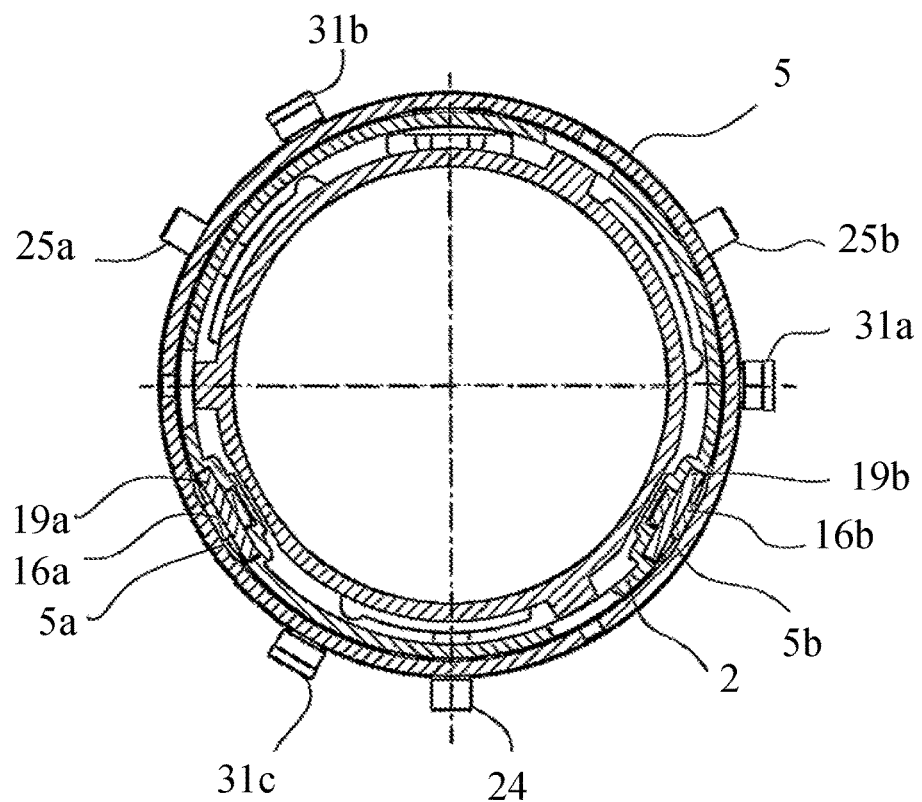
FIG. 12 is a sectional view of a plane that contains a roller installation part in the second lens holding frame.
Figure 13:
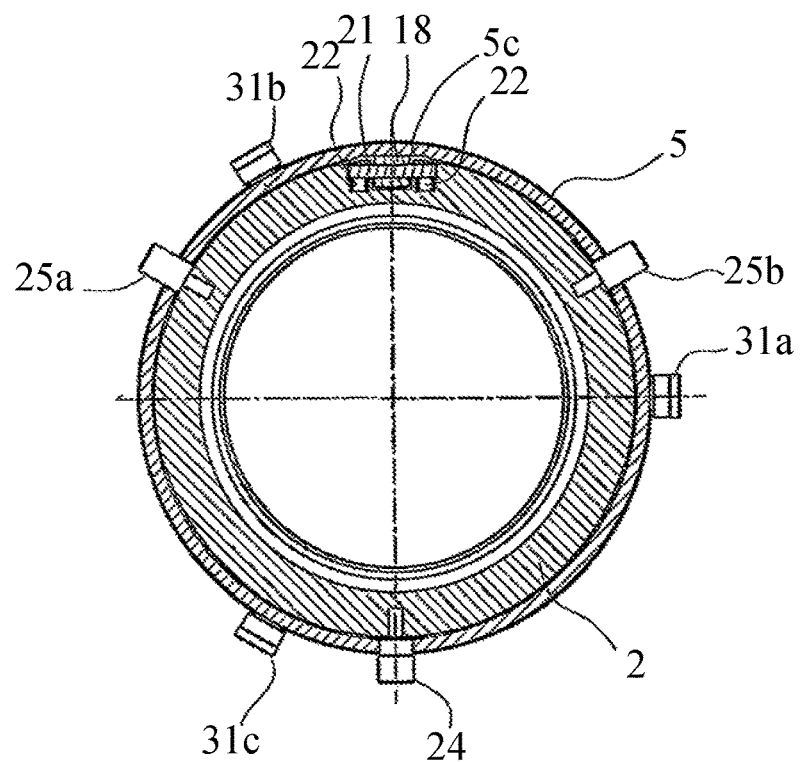
FIG. 13 is a sectional view of the plane that contains a forcing roller installation part in the second lens holding frame.
Figure 14:
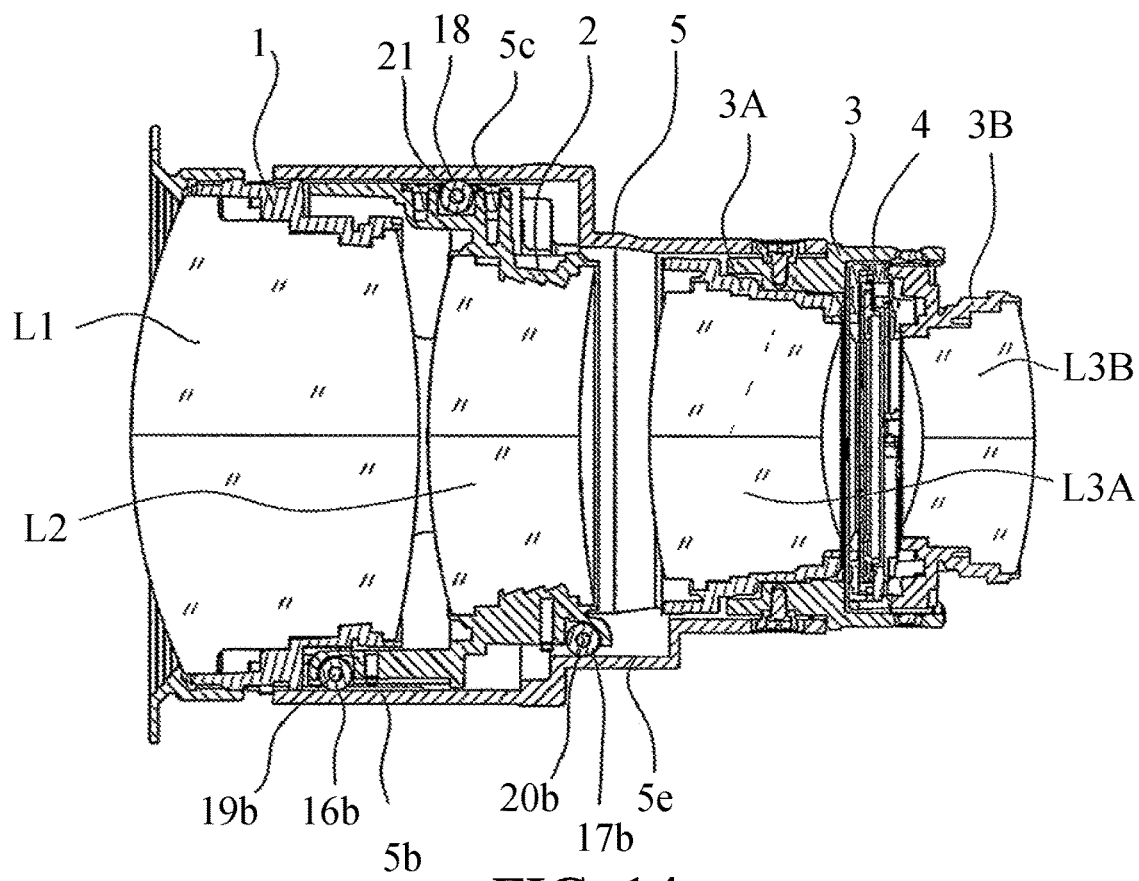
FIG. 14 is a sectional view of the moving mechanism member.

Next follows a description of a structure of the second lens holding frame 2 held movably relative to the linear cylinder 5 on the internal circumference surface side of the linear cylinder 5. FIG. 9 is an exploded perspective view of the second lens holding frame 2 viewed from the front side. FIG. 10 is a perspective view of the second lens holding frame 2 viewed from the backside. FIG. 11 is a side view of the second lens holding frame 2. FIG. 12 is a sectional view of a plane that contains the roller installation part of the second lens holding frame 2 assembled onto the inner surface of the linear cylinder 5. FIG. 13 is a sectional view of a plane that contains the urging roller installation part of the second lens holding frame 2 assembled onto the internal circumference surface of the linear cylinder 5. FIG. 14 is a sectional view of the moving mechanism part.

Each holder for roller shafts 19a and 19b that extend in a direction orthogonal to the radial direction of the second lens holding frame 2 is provided in front of the outer circumference surface of the second lens holding frame 2 (in the optical axis direction). The roller shafts 19a and 19b support rotatably the rollers (first rolling members) 16a and 16b around the direction orthogonal to the radial direction of the second lens holding frame 2. Each holder for roller shafts 20a and 20b that extend in a direction orthogonal to the radial direction of the second lens holding frame 2 is provided behind the outer circumference surface of the second lens holding frame 2 (in the optical axis direction). The roller shafts 20a and 20b support rotatably the rollers (second rolling members) 17a and 17b around the direction orthogonal to the radial direction of the second lens holding frame 2. In this embodiment, the extending directions of the rotating axes for the rollers 16a, 16b, 17a, and 17b are orthogonal to the radial direction of the second lens holding frame 2 and the optical axis (tangential directions of the circumferential direction of the second lens holding frame 2).

A holder for the roller shaft 21 and an assembly member for an urging (or forcing) spring (urging or forcing member) 22 are provided near the center on the outer circumference surface of the second lens holding frame 2 (or near the middle between the front end and the back end of the lens holding frame 2 in the optical axis direction). The roller shaft 21 supports an urging roller (third rolling member) 18 rotatably around the direction orthogonal to the radial direction of the second lens holding frame 2. In other words, the extending direction of the rotating axis for the roller 18 is orthogonal to the radial direction of the second lens holding frame 2 and the optical axis. The urging spring 22 urges the urging roller 18 in the radial direction (to the outside) of the second lens holding frame 2. After the urging roller 18 is assembled into the second lens holding frame 2, a press plate 23 restricts displacements of the urging roller 18 and the roller shaft 21 so as to prevent them from detaching from the second lens holding frame 2 by the reaction of the urging spring 22 and the press plate 23 is screwed on the second lens holding frame 2. Before the second lens holding frame 2 is assembled into the linear cylinder 5, the roller shaft 21 contacts the press plate 23 and serves to prevent the detachment.

This embodiment uses for the rolling member a roller rotatably supported by the shaft that extends in the tangential direction for the circumferential direction of the second lens holding frame 2, but another member, such as a ball, may be used for the rolling member.

The rollers 16a and 17a are arranged at positions having the same angular phases with respect to the optical axis center, and the rollers 16b and 17b are arranged at positions having the same angular phases with respect to the optical axis center. The urging roller 18 is disposed opposite to the rollers 16a, 16b, 17a, and 17b with respect to the optical axis in the radial direction of the second lens holding frame 2.

In the optical axis direction, the rollers 16a and 16b are arranged in front of the center of gravity position of the moving unit that includes the second lens unit L2 and the second lens holding frame 2, and the rollers 17a and 17b are arranged behind the center of gravity position.

In the optical axis direction, assume that A is a distance between the urging roller 18 and the rollers 16a and 16b, and B is a distance between the urging roller 18 and the rollers 17a and 17b. Then, the distance A may be equal to the distance B. The "equal" means "substantially or approximately equal" so as to permit a slight difference between them as well as "exactly equal."

Since it may be difficult to make equal the distance A and the distance B to each other due to the component installation space etc., this embodiment arranges the rollers so as to satisfy the following expression.

$$0.8 \le A/B \le 1.2$$

More specifically, the rollers may be arranged so as to satisfy the following expression.

$$0.9 \le A/B \le 1.1$$

This embodiment disposes the urging roller 18 so as to satisfy the following expression where C is a length of the second lens holding frame in the optical axis direction, and D is a distance between the center of gravity of the moving units and the urging roller 18.

$$D/C \le 0.2$$

The distances between the center of gravity of the moving units and the rollers 16a and 16b in the optical axis direction and the distances between the center of gravity of the moving units and the rollers 17a and 17b in the optical axis direction may be equal to each other. The "equal" means "substantially or approximately equal" so as to permit a slight difference between them as well as "exactly equal."

As illustrated in FIG. 12, the roller shafts 19a and 19b are arranged so that a line (not illustrated) made by connecting the centers of the roller shafts 19a and 19b is orthogonal to a perpendicular to the optical axis from the outer circumference of the second lens holding frame 2 to the optical axis on the plane orthogonal to the optical axis (or on the plane illustrated in FIG. 12). In other words, each of the height from the optical axis when the lens barrel LB has an orientation illustrated in FIG. 12 to the roller shaft 19a (above line) and the height from the optical axis to the roller shaft 19b is always constant. Alternatively, the roller shafts 19a and 19b are arranged on the plane illustrated in FIG. 12 so that the axial directions of the rollers 19a and 19b are orthogonal to the radial direction of the second lens holding frame 2. The roller 16a contacts the rolling surface 5a formed on the internal circumference surface of the linear cylinder 5, and the roller 16b contacts the rolling surface 5b formed on the internal circumference surface of the linear cylinder 5. The rolling surfaces 5a and 5b are planes parallel to the roller shafts 19a and 19b and the optical axis, and the rollers 16a and 16b have a barrel shape with a swelled center part. Thereby, while the rollers 16a and 16b roll, they contact the rolling surfaces 5a and 5b at their center parts. The rolling surfaces 5a and 5b are planes in this embodiment but may be cylindrical surfaces. In this case, the rollers 16a and 16b may have a barrel shape with a radius at the center part smaller than that of the rolling surfaces 5a and 5b. This is applied to the holding structures of the rollers 17a and 17b.

As illustrated in FIG. 13, the roller shaft 21 is assembled in the second lens holding frame 2 while the roller shaft 21 contacts the urging spring 22. The urging spring 22 urges the roller shaft 21 to the outside in the radial direction of the second lens holding frame 2 (in the upper direction in FIG. 13). In other words, the urging roller 18 is pressed against the rolling surface 5c formed on the internal circumference surface of the linear cylinder 5 via the roller shaft 21 and the urging spring 22. The rolling surface 5c is a plane parallel to the roller shaft 21 and the optical axis, and the urging roller 18 is molded into a barrel shape with a swelled center part. Thereby, when the urging roller 18 rolls, the center part always contacts the rolling surface 5c. The rolling surface 5c is a plane in this embodiment but may be a cylindrical surface. In this case, the urging roller 18 may have a barrel shape with a curvature at the center part smaller than that of the rolling surface 5c.

The second lens holding frame 2 is forced in the downward direction in FIG. 13 by the reaction from the rolling surface 5c as a result of that the urging spring 22 presses the urging roller 18 against the rolling surface 5c, and the second lens holding frame 2 is supported on the linear cylinder 5 at four points of the rollers 16a, 16b, 17a, and 17b. These four points receive reactions from the rolling surface 5c. While the second lens holding frame 2 moves along the optical axis in the linear cylinder 5, the second lens holding frame 2 at any positions is forced by the reaction from the rolling surface 5c and supported at the four points of the rollers. This configuration can restrain the inclination change of the second lens holding frame 2 relative to the linear cylinder 5.

The force of the urging spring 22 may be set larger than the own weight of the second lens holding frame 2 so that the second lens holding frame 2 can be always supported at four points of the rollers due to the reaction from the rolling surface 5c even when the application direction of the own weight of the second lens holding frame 2 changes. On the other hand, since an excessively large force is not suitable for the movement of the second lens holding frame 2, a proper force may be set. This embodiment sets the force of the urging spring 22 to about 3 G based on a margin.

As illustrated in FIG. 14, the rollers 16a, 16b, 17a, and 17b are arranged at different heights from the optical axis but the may have the same heights from the optical axis.

As illustrated in FIGS. 9 and 10, a roller (second roller member) 24 is screwed on the second lens holding frame 2. The roller 24 is engaged with a perforating linear groove (second linear groove) 5g formed in the linear cylinder 5, and a cam groove (second cam groove) 7d formed in an internal diameter of the cam cylinder 7. Thereby, the second lens holding frame 2 linearly moves along the optical axis through the cam groove 7d as the cam cylinder 7 rotates while the second lens holding frame 2 is linearly guided by the linear groove 5g in the linear cylinder 5 while supported at the four points of the rollers. The roller 24 may be disposed on the plane that contains the optical axis and the reaction direction from the rolling surface 5c, and this embodiment disposes the roller 24 opposite to the urging roller 18 with respect to the optical axis with a different phase of 180°.

Rollers 25a and 25b are screwed on the second lens holding frame 2. The roller 25a is provided between a linear groove 5i formed in the linear cylinder 5 and a cam groove 7f formed in the cam cylinder 7 with a predetermined aperture, and the roller 25a is not engaged with them. The roller 25b is provided between a linear groove 5h formed in the linear cylinder 5 and a cam groove 7e formed in the cam cylinder 7 with a predetermined aperture, and the roller 25b is not engaged with them. The rollers 25a and 25b thus serve as shock receivers.

Moreover, rollers 26a, 26b, and 26c are screwed on the second lens holding frame 2. The rollers 26a, 26b, and 26c are provided among the linear grooves 5g, 5h, and 5i formed in the linear cylinder 5 with predetermined apertures and serve as shock receivers.

As described above, the second lens holding frame 2 is supported at four points of the rollers on the internal circumference surface side of the linear cylinder 5 while the second lens holding frame 2 is forced in the direction orthogonal to the optical axis by the urging roller 18. Hence, the second lens holding frame 2 can move along the optical axis inside the linear cylinder 5 while the inclination change of the second lens holding frame 2 is restrained relative to the linear cylinder 5. Even when the linear cylinder 5 causes the inclination change, the second lens holding frame 2 inclines with the linear cylinder 5 and thus the inclination change of the second lens holding frame 2 relative to the linear cylinder 5 can be restrained.

The linear cylinder 5 holds the first lens holding frame 1 and the third lens holding frame 3, and the inclination state between the first lens unit L1 and the second lens unit L2 and the inclination state between the third lens unit L3 and the second lens unit L2 do not change due to movements in the optical axis direction and thus the optical performance does not deteriorate.

This embodiment supports the second lens holding frame 2 with the rollers and enables smooth operations of the linear cylinder 5 and the second lens holding frame 2. In addition, the second lens holding frame 2 in this embodiment includes the urging roller 18, and the urging force applied to the second lens holding frame 2 does not change and is always constant even when the second lens holding frame 2 moves along the optical axis. Thus, the second lens holding frame 2 can stably operate, and the inclination change of the second lens holding frame 2 relative to the linear cylinder 5 can be restrained.

Second Embodiment

Figure 15:
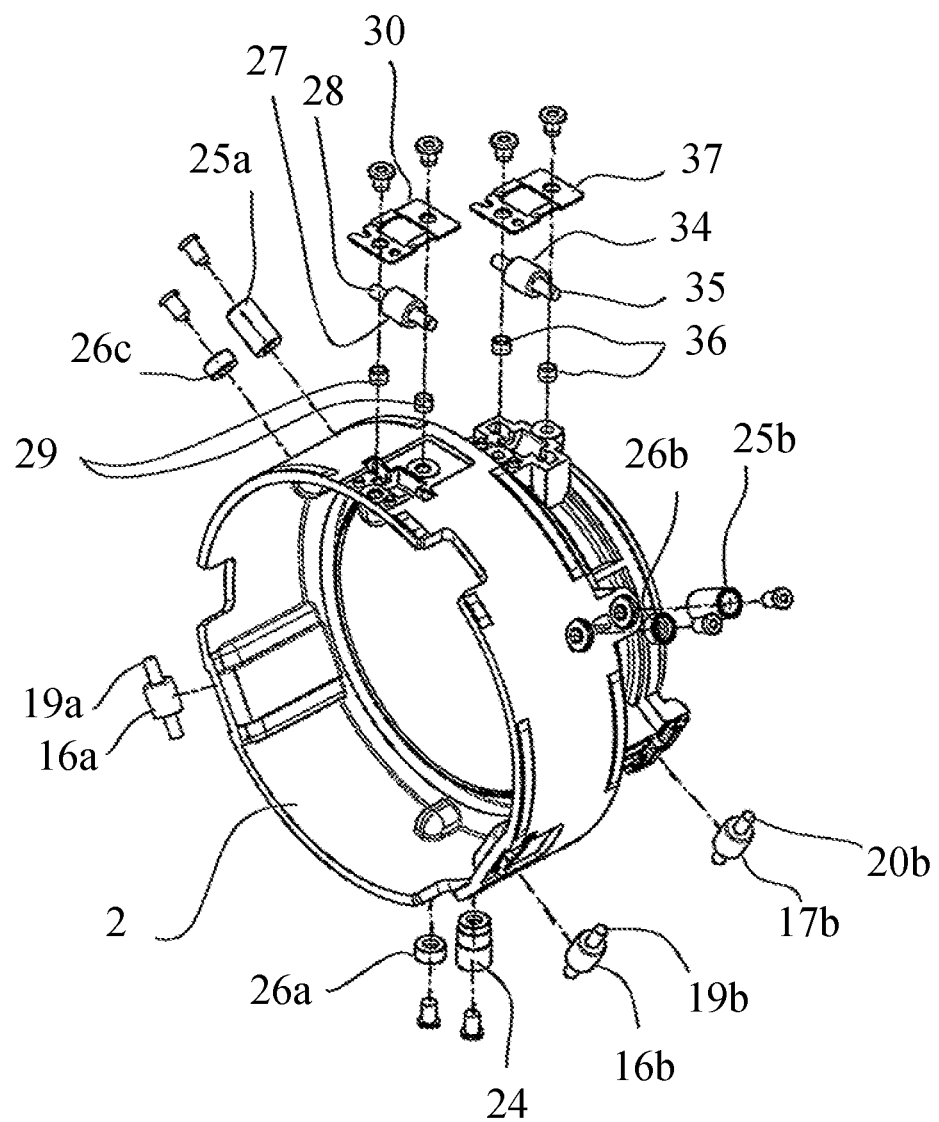
FIG. 15 is an exploded perspective view of a second lens holding frame according to a second embodiment.
Figure 16:
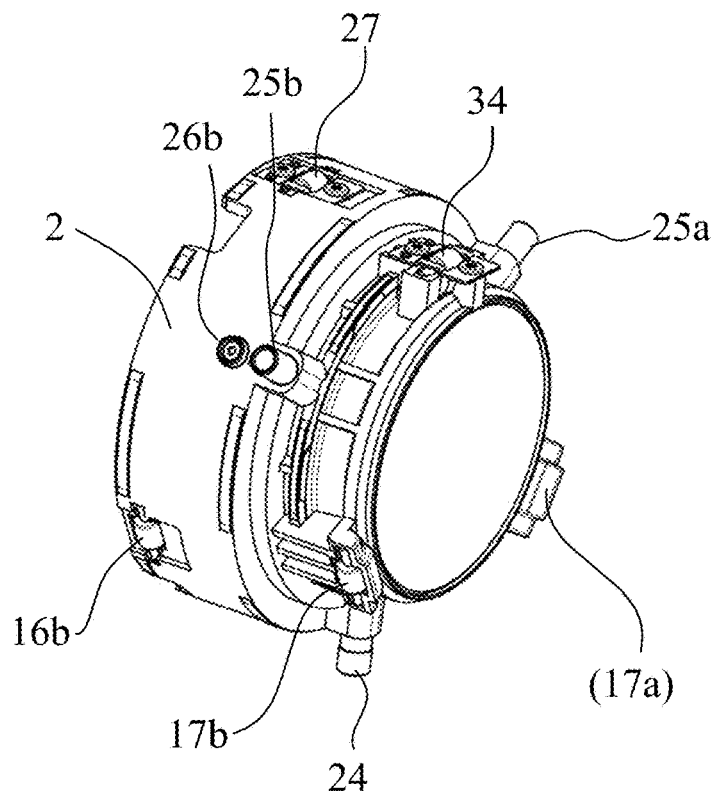
FIG. 16 is a perspective view of the second lens holding frame according to the second embodiment.
Figure 17:
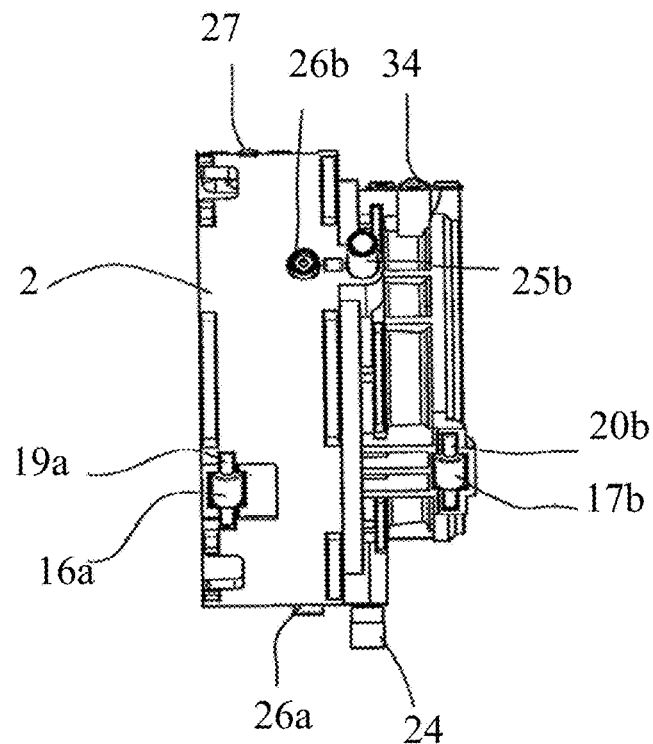
FIG. 17 is a side view of the second lens holding frame according to the second embodiment.

Referring now to FIGS. 15 to 17, a description will be given of this embodiment as to the structure different from that of the first embodiment. FIG. 15 is an exploded perspective view of the second lens holding frame 2 viewed from the front side. FIG. 16 is a perspective of the second lens holding frame 2 viewed from the backside. FIG. 17 is a side view of the second lens holding frame 2. In this embodiment, the second lens holding frame 2 includes two urging rollers 27 and 34.

A holder for the roller shaft 28 that extends in a direction orthogonal to the radial direction of the second lens holding frame 2 and an assembly part for an urging spring (urging member) 29 are provided in front of the outer circumference surface of the second lens holding frame 2. The roller shaft 28 supports the urging roller 27 rotatably around a direction orthogonal to the radial direction of the second lens holding frame 2. The urging spring 29 urges the urging roller 27 in the radial direction of the second lens holding frame 2. The press plate 30 is screwed on the second lens holding frame 2 so as to the urging roller 27 and the roller shaft 28 from being detached from the second lens holding frame 2 by the reaction of the urging spring 29.

A holder for the roller shaft 35 that extends in a direction orthogonal to the radial direction of the second lens holding frame 2 and an assembly part for an urging spring (urging member) 36 are provided behind the outer circumference surface of the second lens holding frame 2. The roller shaft 35 supports the urging roller 34 rotatably around a direction orthogonal to the radial direction of the second lens holding frame 2. The urging spring 36 urges the urging roller 34 in the radial direction of the second lens holding frame 2. The press plate 37 is screwed on the second lens holding frame 2 so as to prevent the urging roller 34 and the roller shaft 35 from being detached from the second lens holding frame 2 by the reaction of the urging spring 36.

The urging roller 27 is disposed in front of the center of gravity position of the moving unit in the optical axis direction that includes the second lens unit L2 and the second lens holding frame 2. The urging roller 27 may be disposed at the same position or behind the rollers 16a and 16b.

The urging roller 34 is disposed behind the center of gravity of the moving unit in the optical axis direction. The urging roller 34 may be disposed at the same position or in front of the rollers 17*a* and 17*b*.

A resultant force between the force by the urging roller 27 and the force by the urging roller 34 is ideally located at the same position as or near the center of gravity position of the moving unit in the optical axis direction, but the present invention is not limited to this example due to the restraints of the component installation space etc.

The urging roller 27 is pressed against the rolling surface formed on the internal circumference surface of the linear cylinder 5 by the urging spring 29. The rolling surface is a plane parallel to the roller shaft 28 and the optical axis, and the urging roller 27 has a barrel shape with a swelled center part. Thereby, the urging roller 27, when rolling, always contacts the rolling surface at the center part. The rolling surface is a plane in this embodiment but may be a cylindrical surface. In this case, the urging roller 27 may be molded in a barrel shape with a curvature smaller than that of the rolling surface.

The urging roller 34 is pressed against the rolling surface formed on the internal circumference surface of the linear cylinder 5 by the urging spring 36. The rolling surface is a plane parallel to the roller shaft 35 and the optical axis, and the urging roller 34 has a barrel shape with a swelled center part. Thereby, the urging roller 34, when rolling, always contacts the rolling surface at the center part. The rolling surface is a plane in this embodiment but may be a cylindrical surface. In this case, the urging roller 34 may be molded in a barrel shape with a curvature smaller than that of the rolling surface.

The second lens holding frame 2 is supported on the linear barrel 5 at four points of the rollers 16*a*, 16*b*, 17*a*, and 17*b* by the reactions from each rolling surface caused by urging springs 29 and 36 pressing the urging rollers 27 and 34 against the rolling surfaces. Since the second lens holding frame 2 is forced by the reaction from each rolling surface and supported at four points of the rollers when moving along the optical axis in the linear cylinder 5, the inclination change of the second lens holding frame 2 relative to the linear cylinder 5 can be restrained. Since the second lens holding frame 2 includes two urging rollers in this embodiment, the inclination change can be more effectively retrained than the first embodiment.

Each force of the urging springs 29 and 36 may be set larger than the own weight of the second lens holding frame 2 so that the second lens holding frame 2 can be always supported at four points of the rollers due to the reaction from each rolling surface even when the application direction of the own weight of the second lens holding frame 2 changes. On the other hand, since an excessively large force is not suitable for the movement of the second lens holding frame 2, a proper force may be set. This embodiment sets each force of the urging springs 29 and 36 to about 3 G based on a margin.

As described above, the second lens holding frame 2 is supported at four points of the rollers on the internal circumference surface side of the linear cylinder 5 while the second lens holding frame 2 is forced in the direction orthogonal to the optical axis by the urging rollers 27 and 34. Hence, the second lens holding frame 2 can move along the optical axis while the inclination change relative to the linear cylinder 5 is more effectively restrained than the first embodiment that urges the second lens holding frame 2 through a single urging roller. Even when the linear cylinder 5 changes the inclination, the second lens holding frame 2 inclines with the linear cylinder 5 and thus the inclination change of the second lens holding frame 2 relative to the linear cylinder 5 can be restrained.

The linear cylinder 5 holds the first lens holding frame 1 and the third lens holding frame 3, and the inclination state between the first lens unit L1 and the second lens unit L2 and the inclination state between the third lens unit L3 and the second lens unit L2 do not change due to movements in the optical axis direction and thus the optical performance does not deteriorate.

This embodiment supports the second lens holding frame 2 with the roller and enables smooth operations of the linear cylinder 5 and the second lens holding frame 2. In addition, the second lens holding frame 2 in this embodiment includes the urging rollers 27 and 34, and the urging forces applied to the second lens holding frame 2 do not change and are always constant even when the second lens holding frame 2 moves along the optical axis. Thus, the second lens holding frame 2 can stably operate, and the inclination change of the second lens holding frame 2 relative to the linear cylinder 5 can be restrained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091555, filed on May 2, 2017, which is hereby incorporated by reference herein in its entirety.

What is claimed is:

1. A lens barrel comprising:
    a first lens holder configured to hold a lens and movable along an optical axis in the lens;
    a cylindrical member configured to hold the first lens holder on an internal circumference surface;
    first and second rolling members provided to the first lens holder, each contacting the cylindrical member, and rotatably disposed at different positions in an optical axis direction of the lens;
    a third rolling member rotatably provided to the first lens holder, and contacting the cylindrical member; and
    an urging member configured to urge the third rolling member against an internal surface of the cylindrical member to an outside in a radial direction of the lens,
    wherein a distance between the first rolling member and the optical axis and a distance between the second rolling member and the optical axis are different from each other.

2. The lens barrel according to claim 1, wherein the third rolling member is located between the first rolling member and the second rolling member in the optical axis direction.

3. The lens barrel according to claim 2, wherein when the third rolling member is located between the first rolling member and the second rolling member in the optical axis direction,
    0.8≤$A/B$≤1.2 is satisfied,
        where A is a distance between the first rolling member and the third rolling member in the optical axis direction, and B is a distance between the second rolling member and the third rolling member in the optical axis direction.

4. The lens barrel according to claim 2, wherein a center of gravity of the lens and the first lens holder is located between the first and second rolling members in the optical axis direction.

5. The lens barrel according to claim 1, wherein when the third rolling member is located between the first rolling member and the second rolling member in the optical axis direction, a distance between the third rolling member and the first rolling member in the optical axis direction is substantially equal to a distance between the third rolling member and the second rolling member in the optical axis direction.

6. The lens barrel according to claim 1, wherein the first lens holder reacts from the cylindrical member caused by a force from the urging member, contacts the cylindrical member via the first and second rolling members, and is movable along the optical axis when the first lens holder is supported by the cylindrical member.

7. The lens barrel according to claim 1, further comprising:
a guide member disposed outside the cylindrical member in the radial direction; and
a cam member disposed outside the guide member in the radial direction and rotatable at a predetermined position relative to the guide member in the optical axis direction;
wherein the cylindrical member includes a first roller member, and the first lens holder includes a second roller member,
wherein the guide member has a first linear groove engaged with the first roller member and extending in the optical axis direction, and the cylindrical member has a second linear groove engaged with the second roller member and extending in the optical axis direction,
wherein the cam member has a first cam groove engaged with the first roller member, and a second cam groove engaged with the second roller member and having a locus different from that of the first groove, and
wherein as the cam member rotates, the cylindrical member moves along the optical axis and the first lens holder moves along the optical axis relative to the cylindrical member.

8. The lens barrel according to claim 7, wherein the second roller member is disposed on a plane that contains the optical axis and the third rolling member.

9. The lens barrel according to claim 1, further comprising a second lens holder configured to hold a lens and fixed onto the cylindrical member.

10. The lens barrel according to claim 9, further comprising a third lens holder configured to hold a lens and fixed onto the cylindrical member at a position different from that of the second lens holder in the optical axis direction.

11. The lens barrel according to claim 1, wherein the lens barrel comprises:
a plurality of third rolling members separated from each other in the optical axis direction; and
a plurality of urging members configured to urge the plurality of third rolling members to the outside in the radial direction on the internal circumference surface of the cylindrical member,
wherein a resultant force of reactions from the cylindrical member which the first lens holder receives applies due to the plurality of urging members between the first rolling member and the second rolling member in the optical axis direction.

12. The lens barrel according to claim 1, wherein a force from the cylindrical member which the first lens holder receives due to the urging member is larger than a force from the weight of the first lens holder.

13. The lens barrel according to claim 1, wherein the first, second, and third rolling members are supported rotatably around a direction orthogonal to a radial direction of the first lens holder.

14. The lens barrel according to claim 1, wherein the first, second, and third rolling members are supported rotatably around a direction orthogonal to a radial direction of the first lens holder and the optical axis.

15. The lens barrel according to claim 1, wherein the internal circumference surface on the cylindrical member has a rolling surface on which the first, second, and third rolling members are rollable.

16. The lens barrel according to claim 1, wherein a center of gravity of the lens and the first lens holder is located between the first and second rolling members in the optical axis direction.

17. The lens barrel according to claim 16, wherein a distance between the center of gravity and the first rolling member in the optical axis direction is substantially equal to a distance between the center of gravity and the second rolling member in the optical axis direction.

18. The lens barrel according to claim 16, wherein when the third rolling member is located between the first rolling member and the second rolling member in the optical axis direction, a center of gravity position between the lens and the first lens holder in the optical axis direction is equal to a position of the third rolling member in the optical axis direction.

19. The lens barrel according to claim 16, wherein when the third rolling member is located between the first rolling member and the second rolling member in the optical axis direction,
$D/C \leq 0.2$ is satisfied,
where C is a length of the first lens holder in the optical axis direction, and D is a distance between the center of gravity of the lens and the first lens holder, and the third rolling member in the optical axis direction.

20. The lens barrel according to claim 1, wherein a rolling surface on which the first rolling member is rotatable and a rolling surface on which a second rolling member is rotatable are formed on the internal circumference surface of the cylindrical member, and
wherein the rolling surfaces are formed at positions to which distances from the optical axis are different.

21. An imaging apparatus comprising:
a lens barrel; and
a camera body configured to hold an image sensor configured to photoelectrically convert light from the lens barrel,
wherein a lens barrel includes:
a first lens holder configured to hold a lens and movable along an optical axis in the lens;
a cylindrical member configured to hold the first lens holder on an internal circumference surface;
first and second rolling members provided to the first lens holder, each contacting the cylindrical member, and rotatably disposed at different positions in an optical axis direction of the lens;
a third rolling member rotatably provided to the first lens holder, and contacting the cylindrical member; and
an urging member configured to urge the third rolling member against an internal surface of the cylindrical member to an outside in a radial direction of the lens,
wherein a distance between the first rolling member and the optical axis and a distance between the second rolling member and the optical axis are different from each other.

* * * * *